(12) United States Patent
Tokito

(10) Patent No.: US 9,651,438 B2
(45) Date of Patent: May 16, 2017

(54) SENSOR ARRANGEMENT STRUCTURE

(71) Applicant: HONDA MOTOR CO., LTD., Tokyo (JP)

(72) Inventor: Akira Tokito, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/834,656

(22) Filed: Aug. 25, 2015

(65) Prior Publication Data

US 2016/0084721 A1 Mar. 24, 2016

(30) Foreign Application Priority Data

Sep. 24, 2014 (JP) .................................. 2014-193264

(51) Int. Cl.
| | |
|---|---|
| *G01L 3/02* | (2006.01) |
| *G01L 3/10* | (2006.01) |
| *G01P 3/44* | (2006.01) |
| *G01L 5/00* | (2006.01) |
| *G01P 1/02* | (2006.01) |

(52) U.S. Cl.
CPC .............. *G01L 3/108* (2013.01); *G01L 5/00* (2013.01); *G01P 1/026* (2013.01); *G01P 3/44* (2013.01)

(58) Field of Classification Search
CPC ... G01P 3/44; G01P 1/026; G01L 5/00; G01L 3/108

USPC ...................................... 73/862.08, 862.191
See application file for complete search history.

(56) References Cited

U.S. PATENT DOCUMENTS

| | | | | | |
|---|---|---|---|---|---|
| 4,934,501 | A | * | 6/1990 | Gay ........................ | F16D 23/14 192/30 W |
| 6,659,895 | B2 | * | 12/2003 | Fukuda .................. | B62M 9/122 324/168 |
| 6,772,646 | B1 | * | 8/2004 | Madni ..................... | G01L 5/221 73/862.337 |
| 2005/0054473 | A1 | * | 3/2005 | Burns ..................... | F16H 59/42 475/257 |
| 2012/0204658 | A1 | * | 8/2012 | Mercat .................. | G01L 3/1457 73/862.338 |
| 2013/0255432 | A1 | * | 10/2013 | Nomura ................... | G05G 1/10 74/504 |

FOREIGN PATENT DOCUMENTS

JP 08-262049 A 10/1996

* cited by examiner

*Primary Examiner* — Max Noori
(74) *Attorney, Agent, or Firm* — Squire Patton Boggs (US) LLP

(57) ABSTRACT

A sensor arrangement structure includes an output shaft provided with a disc portion at a leading end portion thereof. An output shaft cover has an inner surface portion disposed along and close to the disc portion. The disc portion is provided with ribs, the ribs extending in a radial direction of the disc portion while protruding toward the inner surface portion. A detector is disposed more inward in the radial direction of the disc portion than the ribs.

10 Claims, 7 Drawing Sheets

FIG. 1

SENSOR ARRANGEMENT STRUCTURE

BACKGROUND

Field

The present invention relates to a sensor arrangement structure.

Description of the Related Art

In the related art, a sensor for the output shaft of an engine is disposed, for example, on a sprocket cover, and this sensor detects the rotational speed or the like of the output shaft.

However, within the sprocket cover, a drive sprocket rotates at a high speed and a driving chain is fed at a high speed, leading to an environment where foreign material, such as dirt, dust, sand, pebbles, or oil, is splattered. It is therefore necessary to prevent the intrusion of foreign material into the sprocket cover because the intrusion of foreign material can cause deterioration in the detection performance of the sensor.

As this technique, in the related art, a configuration is disclosed in which a sensor for detecting the rotational speed of a countershaft is disposed within the sprocket cover that covers the drive sprocket of the countershaft. See, for example, Japanese Patent Publication JP-A No. Hei 08-262049 (Patent Literature 1).

In Patent Literature 1, the sensor is disposed in a space surrounded by the sprocket cover, a cylindrical portion, and a lid member so as to prevent the intrusion of foreign material into the periphery of the sensor. However, in the configuration disclosed in the Patent Literature 1, in case of intrusion of foreign material into the periphery of the sensor, the foreign material cannot be removed, and a structure for more effectively preventing the intrusion of foreign material into the periphery of the sensor has been desired.

SUMMARY

Accordingly, the present invention has been made in view of the above circumstances, and an object of the present invention is to provide a sensor arrangement structure, whereby it is possible to reliably prevent the intrusion of foreign material into the periphery of sensors, and to discharge the foreign material having intruded therein to the outside.

In order to accomplish the above-mentioned object, an embodiment of the present invention provides a sensor arrangement structure including a power unit, an output shaft that protrudes outwardly from a unit case of the power unit, and an output shaft cover that covers the output shaft from outside in a protruding direction of the output shaft. A detector is mounted to the output shaft cover in order to detect rotational speed or torque of the output shaft. The output shaft is provided with a disc portion at a leading end portion thereof. The output shaft cover has an inner surface portion disposed along and close to the disc portion. The disc portion is provided with ribs, the ribs extending in a radial direction of the disc portion while protruding toward the inner surface portion. The detector is disposed more inward in the radial direction of the disc portion than the ribs.

By forming the ribs on the disc portion, when foreign material intrudes between the disc portion and the inner surface portion of the output shaft cover, the foreign material is guided toward the outside in the radial direction of the disc portion through the ribs by the centrifugal force of the rotating disc portion, and pushed out to the outside in the radial direction of the disc portion. As a result, the intrusion of foreign material between the disc portion and the inner surface portion of the output shaft cover can be effectively prevented. At this time, because the detector is disposed more inward in the radial direction of the disc portion than the ribs, the intrusion of foreign material into the detector can be effectively suppressed.

In certain embodiments, the ribs can be formed so as to be inclined so that the more outward in the radial direction of the disc portion, the more rearward the ribs are positioned with respect to a rotational direction of the disc portion. Because the ribs are formed so as to be inclined so that the more outward in the radial direction of the disc portion, the more rearward the ribs are positioned with respect to the rotational direction of the disc portion, the force in the rotational direction of the disc portion can be converted into the force in the radial direction of the disc portion, thereby allowing more effective discharge of foreign material to the outside.

In certain embodiments, the inner surface portion of the output shaft cover is provided with cover-side ribs. The cover-side ribs extend in the radial direction of the disc portion while protruding toward the disc portion.

In certain embodiments, the cover-side ribs are formed on the inner surface portion of the output shaft cover, thereby allowing further effective discharge of foreign material to the outside in association with the ribs on the disc portion.

In certain embodiments, the cover-side ribs can be formed so as to be inclined so that the more outward in the radial direction of the disc portion, the more forward the cover-side ribs are positioned with respect to the rotational direction of the disc portion.

In certain embodiments, the cover-side ribs are formed so as to be inclined so that the more outward in the radial direction of the disc portion, the more forward the cover-side ribs are positioned with respect to the rotational direction of the disc portion. Thus, the ribs and the cover-side ribs are configured so as to intersect with each other, thereby allowing further effective discharge of foreign material to the outside.

In certain embodiments, the disc portion can be provided with a transmitter that transmits the rotational speed or torque detection signal of the output shaft to the detector, and a gap between the ribs and the cover-side ribs, a gap between the transmitter and the detector, a gap between the inner surface portion of the output shaft cover and an end surface of the disc portion are formed in increasing order.

Because the gap between the ribs and the cover-side ribs, the gap between the transmitter and the detector, the gap between the inner surface portion of the output shaft cover and the end surface of the disc portion are formed in increasing order, even if foreign material intrudes into the inside in the radial direction of the disc portion, its size is smaller than the gap between the transmitter and the detector. Therefore, there is no possibility of the occurrence of a malfunction, such as jamming of foreign material, between the inner peripheral surface of the disc portion and the outer peripheral surface of the output shaft cover. Further, the foreign material having intruded between the inner peripheral surface of the disc portion and the outer peripheral surface of the output shaft cover can be easily discharged to the outside in the radial direction of the disc portion.

With the sensor arrangement structure according to embodiments of the present invention, it is possible to reliably prevent the intrusion of foreign material between the disc portion and the inner surface portion of the output shaft cover, and to effectively suppress the intrusion of foreign material into the detector.

Furthermore, the force in the rotational direction of the disc portion can be converted into the force in the radial direction of the disc portion, thereby allowing more effective discharge of foreign material to the outside.

Moreover, the foreign material can be further effectively discharged to the outside in association with the ribs on the disc portion.

Further, the ribs and the cover-side ribs are arranged so as to intersect with each other, thereby allowing further effective discharge of foreign material to the outside.

Additionally, even if foreign material intrudes into the inside in the radial direction of the disc portion, there is no possibility of the occurrence of a malfunction, such as jamming of foreign material, between the inner peripheral surface of the disc portion and the outer peripheral surface of the output shaft cover. Further, the foreign material having intruded between the inner peripheral surface of the disc portion and the outer peripheral surface of the output shaft cover can be easily discharged to the outside in the radial direction of the disc portion.

BRIEF DESCRIPTION OF DRAWINGS

FIG. 1 is a left side view of a motorcycle according to an embodiment of the present invention.

DETAILED DESCRIPTION

Figure 2:
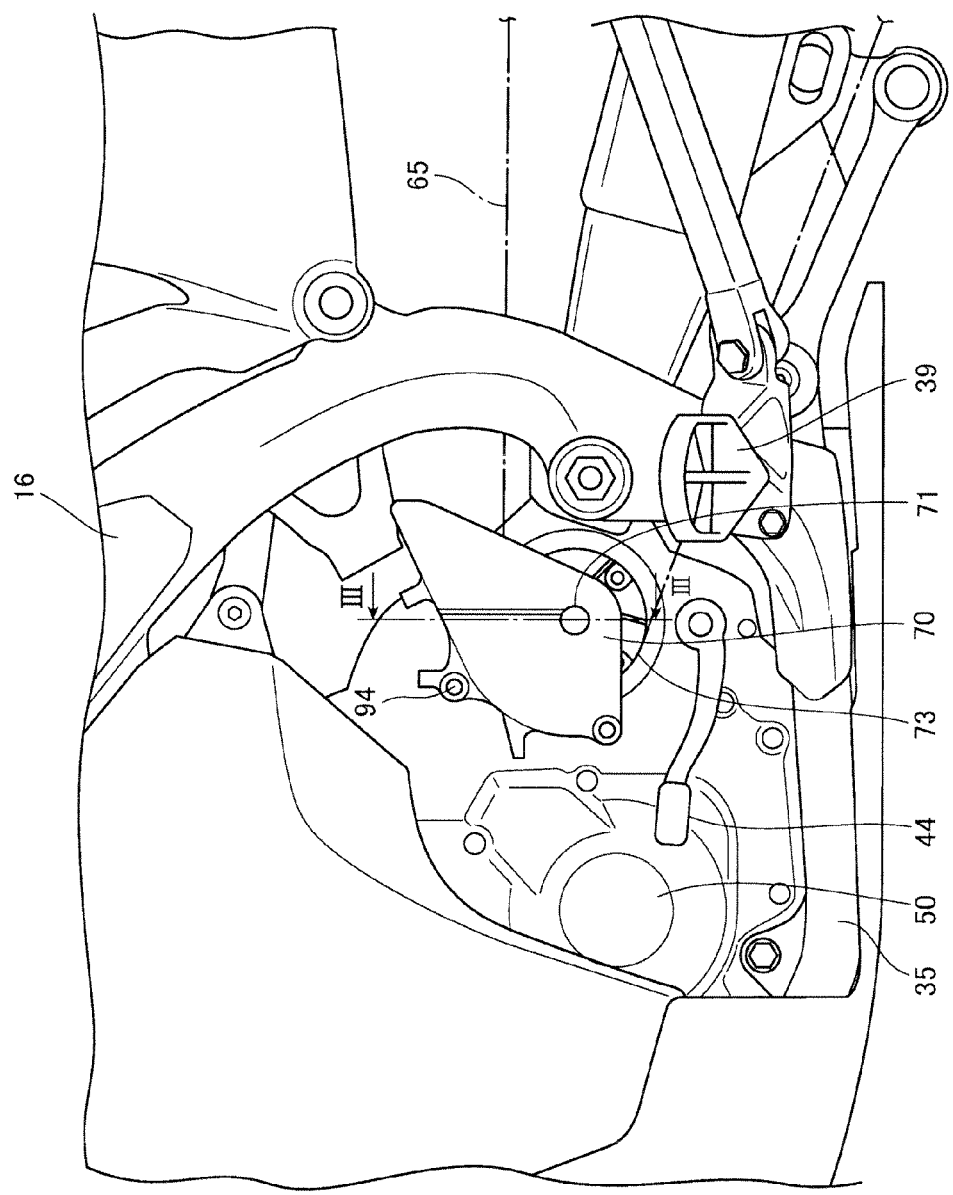
FIG. 2 is an enlarged view of a crankcase portion of FIG. 1.

Hereinafter, an embodiment of the present invention will be described with reference to the accompanying drawings. It is to be noted that, throughout the description, references to directions, such as front, rear, left, right, top, and bottom, are made with reference to a vehicle body, unless otherwise stated. It is also to be noted that, in the drawings, reference sign FR denotes the front of the vehicle body, reference sign UP denotes the upper side of the vehicle body, and reference sign LH denotes the left of the vehicle body.

Figure 1:
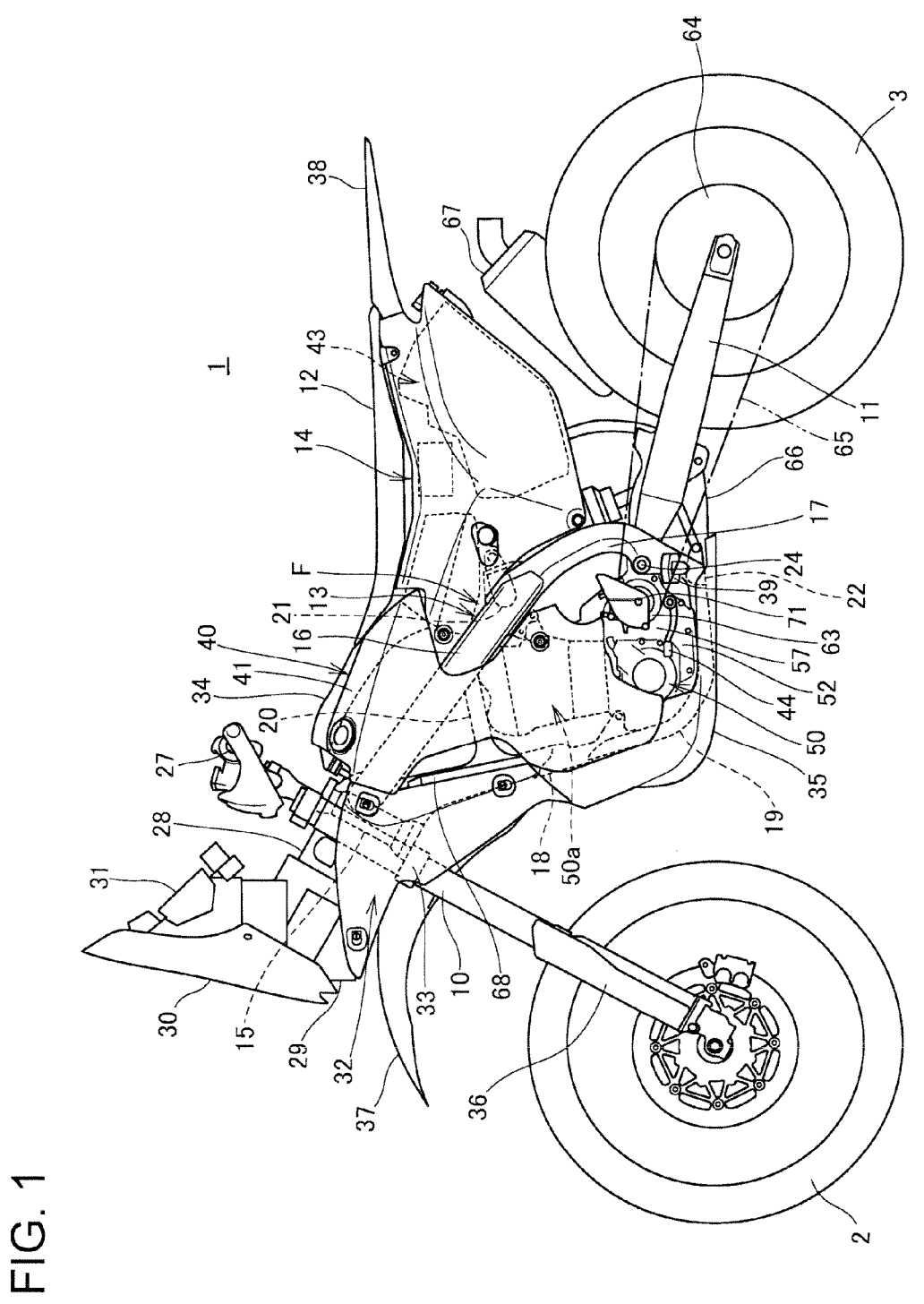

FIG. 1 is a left side view of a motorcycle 1 according to an embodiment of the present invention, and FIG. 2 is an enlarged view of a crankcase portion of an engine in FIG. 1. It should be noted that, in FIG. 1, as for the elements described as a left-and-right pair, only the left-hand one is shown.

A body frame F is provided with a front frame 13 that is formed in basket shape by connecting a pipe material and a plate material by welding or the like, and a resin rear frame 14 that is coupled to a rear portion of the front frame 13.

The front frame 13 is provided with a head pipe 15 provided at a front end, and a pair of left and right main frames 16 extending obliquely downward to the rear from the head pipe 15. A pair of left and right pivot frames 17 extend downward from rear ends of the main frames 16. The front frame 13 is also provided with a down frame 18 that extends downwardly and obliquely rearward from the rear face of a lower portion of the head pipe 15, and a pair of left and right under frames 19 that branches into left and right from the down frame 18 and extends downward, and then bends almost horizontally to the rear to be coupled to lower ends of the pivot frames 17.

Furthermore, the front frame 13 is provided with a reinforcing frame 20 that couples an upper portion of the down frame 18 and longitudinally intermediate portions of the left and right main frames 16. Further, the front frame 13 is provided with an upper cross member 21 that couples upper portions of the left and right pivot frames 17 in the vehicle width direction and a lower cross member 22 that couples lower portions of the left and right pivot frames 17 in the vehicle width direction.

Rear portions of the left and right main frames 16, upper portions of the left and right under frames 19, front ends of the horizontal portions of the left and right under frames 19 support an engine 50.

A pivot shaft 24 is provided at a lower portion of the left and right pivot frames 17, and a front end portion of a swing arm 11 is supported by the pivot shaft 24 so as to be vertically swingable. A rear wheel 3 is journaled to a rear end portion of the swing arm 11.

A front fork 10 is steerably journaled to the head pipe 15 through a steering shaft (not shown), and a front wheel 2 is journaled to a lower end portion of the front fork 10. A steering handlebar 27 is fixed to an upper end portion of the front fork 10.

A front stay 28 protruding forward is fixed to a front portion of the head pipe 15, and a headlight 29, a plate-like wind screen 30 and meters 31 are supported on the front stay 28.

A fuel tank 40 is provided with a pair of left and right front tanks 41 that are arranged in such a manner as to split into the left and right lateral sides of the left and right main frames 16, and a rear tank 43 that is provided within the rear frame 14.

A seat 12 is continuous with a rear portion of the front tank 41 and extends rearward, and is supported on an upper portion of the rear frame 14.

The motorcycle 1 is provided with a resin body cover 32. The body cover 32 is provided with a pair of left and right shrouds 33 that cover an upper portion of the front fork 10 and the down frame 18 from lateral sides, and a tank cover 34 that covers the front tank 41 from above. An undercover 35 covers the under frames 19 and a crankcase (unit case) 52 of the engine 50 from the front and below. A pair of left and right fork covers 36 that cover a lower portion of the front fork 10.

A front fender 37 for covering the front wheel 2 from above is fixed to the front fork 10. A rear fender 38 for covering the rear wheel 3 from above is fixed to the rear frame 14 at the rear of the seat 12.

A pair of left and right steps 39 on which an occupant is to place his/her feet are provided at lower end portions of the pair of left and right pivot frames 17. A shift pedal 44 is provided forward of the left step 39.

The engine 50, serving as a power unit, is supported within the basket-shaped front frame 13. A crankshaft (not shown) of the engine 50 is disposed so as to extend horizontally in the vehicle width direction. The engine 50 is provided with the crankcase 52 and a cylinder portion 50a that protrudes upwardly from a front portion of the crankcase 52.

A transmission 57 is attached to a rear portion of the engine 50. In the transmission 57, an output shaft 71 protrudes to the left from a rear portion of the crankcase 52 and a drive sprocket 63 is fixed to a shaft end of the output shaft 71. The power of the engine 50 is transmitted to the rear wheel 3 through a driving chain 65 stretched between the drive sprocket 63 and a driven sprocket 64 that is integrally provided on the rear wheel 3. The drive sprocket 63 is covered with a sprocket cover 70 serving as an output shaft cover.

An exhaust pipe 66 of the engine 50 extends forwardly and downwardly from the front surface of the cylinder portion 50a, and then is pulled out to the right lateral side and extends rearward along the under frame 19 to be connected to a muffler 67 that is disposed on the right lateral side of the rear wheel 3. The muffler 67 is supported by the rear frame 14.

A pair of left and right plate-like radiators 68 through which cooling water of the engine 50 circulates are provided between the down frame 18 and the left and right shrouds 33.

The front tanks 41 extend downwardly from the outer sides of the left and right main frames 16 while extending between the left and right shrouds 33 and the rear frame 14 and each have such size as to cover the cylinder portion 50a and the lateral side of a front portion of the crankcase 52.

Figure 3:
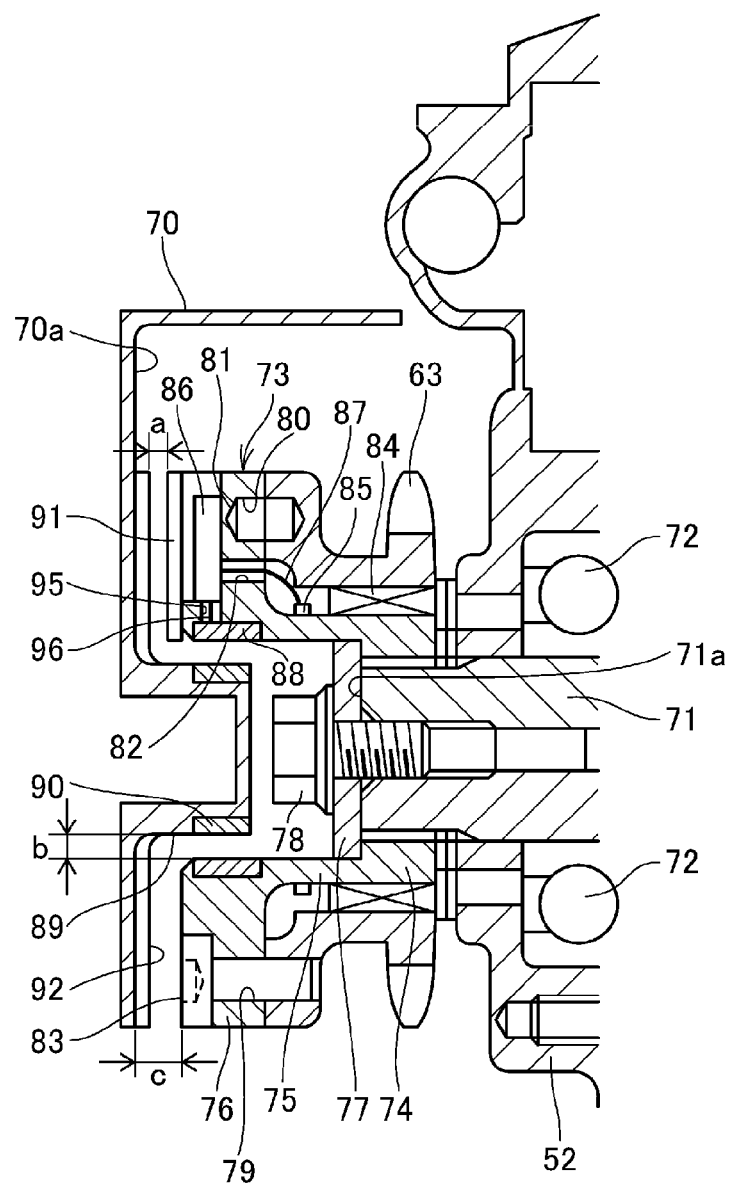
FIG. 3 is a sectional view taken along line III-III of FIG. 2.
Figure 4:
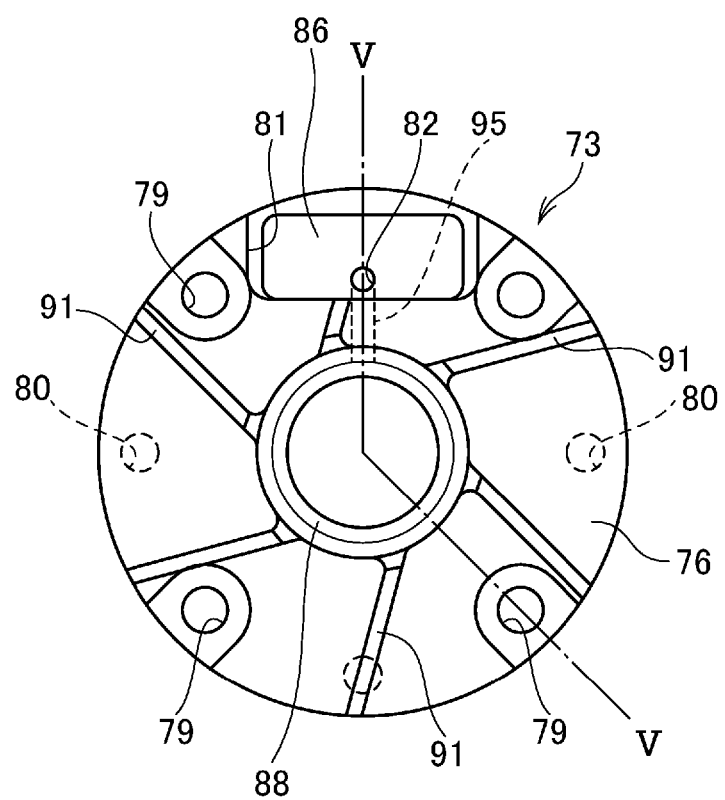
FIG. 4 is a side view of a disc member.
Figure 5:
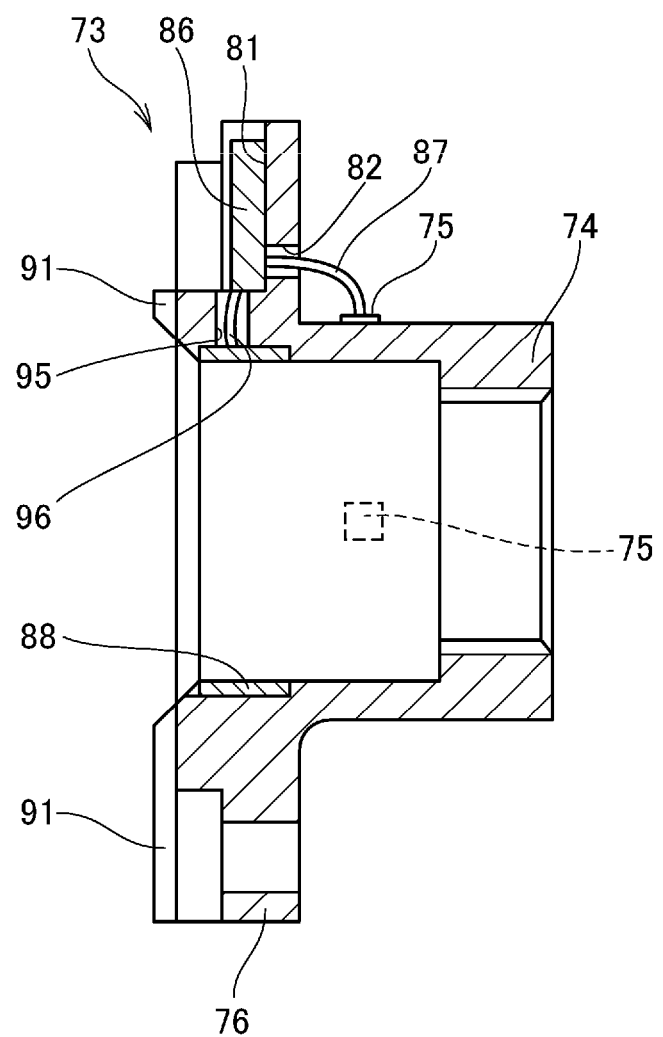
FIG. 5 is a sectional view taken along line V-V of FIG. 4.
Figure 6:
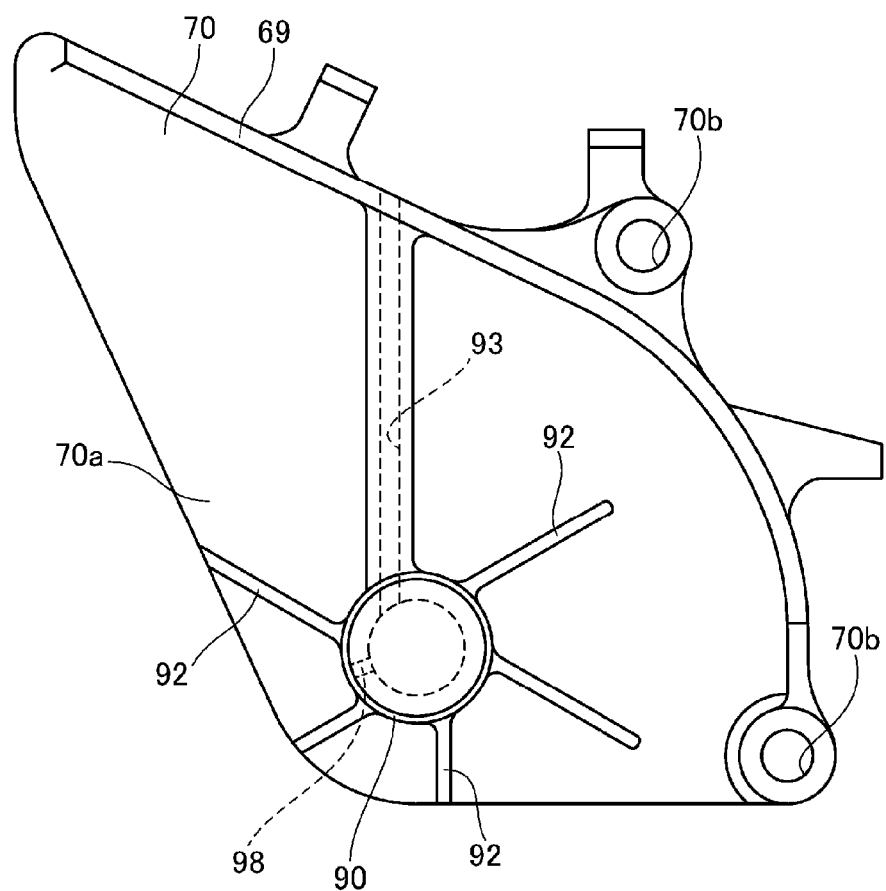
FIG. 6 is a side view of the inner face side of a sprocket cover.
Figure 7:
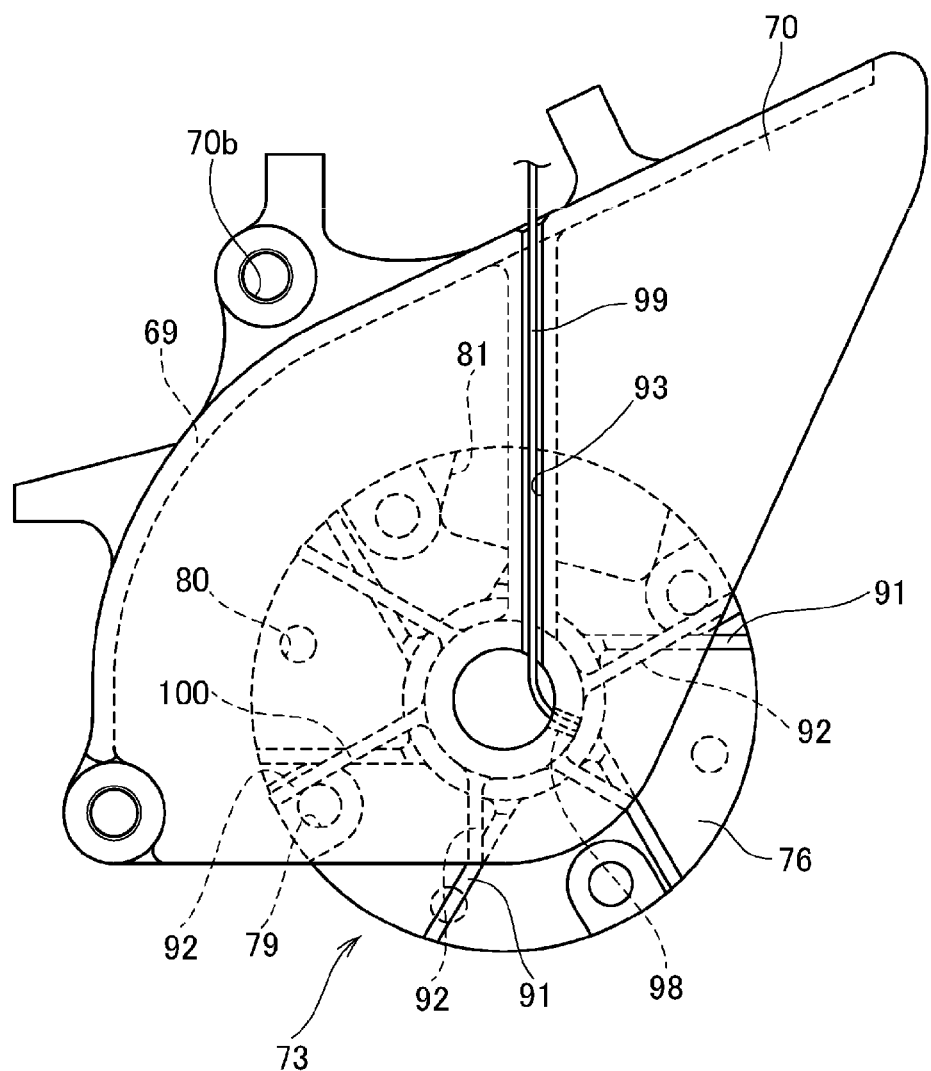
FIG. 7 is a side view of the disc member and the sprocket cover.

FIG. 3 is a sectional view taken along line III-III of FIG. 2, which shows the details of the vicinity of the drive sprocket 63 of the engine 50. FIG. 4 is a side view of a disc member 73, and FIG. 5 is a sectional view taken along line V-V of FIG. 4. FIG. 6 is a side view of the sprocket cover 70 as viewed from the inside in the vehicle width direction. FIG. 7 is a side view of the sprocket cover 70 and the disc member 73 as viewed from the outside in the vehicle width direction.

As shown in FIG. 3, in the crankcase 52 of the engine 50, the output shaft 71 connected to a drive shaft (not shown) of the engine 50 through the transmission 57 is rotatably supported by bearings 72. The output shaft 71 extends in the width direction of the vehicle body and is disposed so as to protrude from an end portion of the crankcase 52. The sprocket cover 70 is mounted to the crankcase 52 so as to cover a leading end portion of the output shaft 71.

A covering plate 69 extending toward the crankcase 52 from front and upper portions of the outer peripheral edge on the inside thereof is provided on the sprocket cover 70. Thus, since the covering plate 69 of the sprocket cover 70 covers front and upper portions of the drive sprocket 63 and the driving chain 65, the sprocket cover 70 is configured so as to also serve as a chain cover.

Furthermore, a bolt hole 70b is formed in each of a front lower portion and a front upper portion of the sprocket cover 70. Bolts 94 are inserted into the bolt holes 70b and screw-threaded to the crankcase 52, thereby fixing the sprocket cover 70 to the crankcase 52.

The disc member 73 is mounted to the leading end portion of the output shaft 71. The disc member 73 is provided with an engaging portion 74 that engages with the outer periphery of an end portion of the output shaft 71, and a cylindrical portion 75 that has an inner diameter slightly larger than the inner diameter of the engaging portion 74. A disc portion 76 is disposed so as to face the inner surface of the sprocket cover 70.

While the engaging portion 74 of the disc member 73 is in engagement with the outer periphery of the end portion of the output shaft 71, a bolt 78 is screw-threaded to an end portion 71a of the output shaft 71 with a pressing plate 77 interposed therebetween inside the cylindrical portion 75, thereby integrally fixing the disc member 73 to the output shaft 71.

In the disc portion 76 of the disc member 73, bolt holes 79 are formed at circumferentially predetermined spaced intervals, and locating holes 80 for positioning are formed between the bolt holes 79. Further, a housing recessed portion 81 formed by partially cutting out the outer periphery is formed on one surface side of the disc portion 76 of the disc member 73. The housing recessed portion 81 is formed with a wiring hole 82 that passes through the other surface side of the disc portion 76.

The drive sprocket 63 is disposed on the inside surface in the vehicle width direction of the disc member 73. While the drive sprocket 63 is positioned through the locating holes 80, bolts 83 are passed through the bolt holes 79 and screw-threaded to the drive sprocket 63, thereby fixing the disc member 73 and the drive sprocket 63.

A needle bearing 84 is disposed between the outer peripheral surface of the disc member 73 and the inner peripheral surface of the drive sprocket 63. Since the cylindrical portion 75 of the disc member 73 can undergo deformation due to the rotation of the output shaft 71 because of its relatively thin thickness, the needle bearing 84 is disposed between the disc member 73 and the drive sprocket 63, thereby integrally supporting the disc member 73 and the drive sprocket 63 and allowing an increase in the rotational accuracy of the drive sprocket 63.

The driving chain 65 is stretched between the drive sprocket 63 and the driven sprocket 64 that is mounted coaxially with the rear wheel 3. Thus, the drive sprocket 63 is integrally rotatively driven by the rotation of the output shaft 71, and the rear wheel 3 is driven by transmitting the rotative power of the drive sprocket 63 to the driven sprocket 64 through the driving chain 65.

Furthermore, in this embodiment, two distortion sensors 85 can be mounted on the outer peripheral surface of the cylindrical portion 75 of the disc member 73. The distortion sensors 85 are arranged, for example, at intervals circumferentially of the cylindrical portion 75 of the disc member 73, and arranged, for example, so that the interior angle of each distortion sensor 85 with respect to the center of the cylindrical portion 75 is 90°. When the cylindrical portion 75 of the disc member 73 undergoes deformation during the passage of a current, a resistance change occurs in response to the deformation in the cylindrical portion 75. By detecting this resistance change as a current change, the distortion sensor 85 detects distortion.

A controller 86 is housed in the housing recessed portion 81 of the disc portion 76, and the controller 86 and the distortion sensors 85 are electrically connected by a wire 87 passing through the wiring hole 82.

Furthermore, an annular transmitting antenna 88 serving as a transmitting portion is installed on an inner peripheral surface of the disc portion 76 of the disc member 73. The transmitting antenna 88 is formed so as to be flush with the inner peripheral surface of the disc member 73. The disc portion 76 of the disc member 73 is formed with a hole portion 95 that provides communication between the back surface of the transmitting antenna 88 and the housing recessed portion 81. The transmitting antenna 88 is electrically connected to the controller 86 through a wire 96 passing through the hole portion 95.

On an inner surface portion 70a of the sprocket cover 70, there is formed a cylindrical portion 89 that is located coaxially with the disc member 73 and inside the inner peripheral surface of the disc member 73. On the outer peripheral surface of the cylindrical portion 89, an annular receiving antenna 90 serving as a detector is installed so as to face the transmitting antenna 88.

Furthermore, an upwardly-extending guide groove 93 is formed in an outer surface portion of the sprocket cover 70, and a hole portion 98 communicating with the inner surface of the receiving antenna 90 is formed in the cylindrical portion 89 of the sprocket cover 70. A detecting device (not shown) installed in the vehicle body is connected to the receiving antenna 90 through a cable 99 that passes through the guide groove 93 and the hole portion 98 of the sprocket cover 70.

Electricity is given from the detecting device to the receiving antenna 90, and converted into a magnetic force by the receiving antenna 90. The transmitting antenna 88 converts the magnetic force into electricity and transmits the electricity to the controller 86. Thus, the controller 86 can supply the electricity to the distortion sensors 85.

When, with the distortion sensors 85 supplied with electricity in this manner, the cylindrical portion 75 of the disc member 73 becomes deformed, the resistance value detected by the distortion sensors 85 changes. The resistance value is input to the controller 86, and a signal corresponding to the resistance value is sent out through the transmitting antenna 88. The signal sent from the transmitting antenna 88 is received by the receiving antenna 90, and, by analyzing the signal with the detecting device, distortion of the disc member 73 can be detected. By detecting this distortion, torque applied to the output shaft 71 can be detected.

In this manner, in this embodiment, the distortion of the output shaft 71, that is, of the cylindrical portion 75 of the disc member 73 is detected by the distortion sensors 85 and transmitted through the transmitting antenna 88. Thus, the distortion can be more reliably detected by the receiving antenna 90 and the value of distortion of the output shaft 71 can be easily taking out.

A plurality of ribs 91 extending radially in the radial direction of the disc portion 76 can be formed in a protruding manner on the surface of the disc portion 76 of the disc member 73 which faces the inner surface portion 70a of the sprocket cover 70. Each of the ribs 91 is formed so as to be inclined so that the more outward in the radial direction of the disc portion 76, the more rearward it is positioned with respect to the rotational direction of the disc portion 76. Further, the receiving antenna 90 is disposed more inward in the radial direction of the disc portion 76 than the ribs 91.

Also, a plurality of cover-side ribs 92 protruding toward the disc portion 76 and extending in the radial direction of the disc portion 76 are formed in a protruding manner on the inner surface portion 70a of the sprocket cover 70. Each of the cover-side ribs 92 is formed so as to be inclined so that the more outward in the radial direction of the disc portion 76, the more forward it is positioned with respect to the rotational direction of the disc portion 76. That is, the cover-side rib 92 is configured so as to be inclined in the opposite direction to the rib 91, and an intersecting portion 100 of the rib 91 and the cover-side rib 92 when viewed in the axial direction is configured so as to move from inside outward in the radial direction with the rotation of the disc portion 76.

With this configuration, when foreign material such as exterior dirt or dust intrudes between the disc portion 76 and the inner surface portion 70a of the sprocket cover 70, the foreign material, between the ribs 91 and the cover-side ribs 92, is guided toward the outside in the radial direction of the disc portion 76 by the centrifugal force of the rotating disc portion 76 and the outward movement of the intersecting portions 100, and pushed out to the outside in the radial direction of the disc portion 76.

Moreover, a gap a between the top of the ribs 91 and the top of the cover-side ribs 92, a gap b between the transmitting antenna 88 and the receiving antenna 90, a gap c between the inner surface portion 70a of the sprocket cover 70 and the end surface of the disc member 73 are formed so as to satisfy the relationship of a<b<c.

That is, the structure is such that the foreign material between the ribs 91 and the cover-side ribs 92 is pushed out to the outside in the radial direction of the disc portion 76 by the centrifugal force due to the rotation of the disc portion 76 and the outward movement of the intersecting portion 100 as described above. However, even if foreign material intrudes into the inside in the radial direction of the disc portion 76, its size is smaller than the gap between the transmitting antenna 88 and the receiving antenna 90 because of the relationship between the gaps a and b, and therefore a malfunction, such as jamming of foreign material, between the inner peripheral surface of the disc member 73 and the outer peripheral surface of the cylindrical portion 89 of the sprocket cover 70 is less likely to occur.

Further, since the gap c between the inner surface portion 70a of the sprocket cover 70 and the end surface of the disc member 73 is formed larger than the gap b between the transmitting antenna 88 and the receiving antenna 90, the foreign material having intruded between the inner peripheral surface of the disc member 73 and the outer peripheral surface of the cylindrical portion 89 of the sprocket cover 70 can be easily discharged to the outside in the radial direction of the disc member 73.

Here, conventionally, for example as disclosed in Japanese Published Unexamined Patent Application No. Hei 05-196517, there is a technique in which a transducer is installed on a shaft around the axis extending in the axial direction so as to receive a torsional stress due to the torque applied to the shaft and form a magnetic field changed in accordance with the torque, and a magnetic field vector sensor is provided in the vicinity of the transducer for detecting the amplitude of the magnetic field generated by the torque and supplying an electrical signal indicated by the torque.

In this related art, there is a problem in that, because the transducer constituting a transmitter-receiver and the magnetic field vector sensor are disposed on the outer peripheral side of the shaft, large installation space is required and a cover or seal for protecting the transmitter-receiver is also required.

However, in this embodiment of the invention, the transmitting antenna 88 is provided on the inner peripheral side of the disc member 73 and the receiving antenna 90 is provided on the inner peripheral side of the cylindrical portion 89 of the sprocket cover 70, thereby requiring less installation space and eliminating the need for a special cover or seal for protecting the transmitting antenna 88 and the receiving antenna 90.

As described above, according to certain embodiments, the sensor arrangement structure forms the ribs 91 on the disc portion 76. Thus, when foreign material intrudes between the disc portion 76 and the inner surface portion 70a of the sprocket cover 70, the foreign material is guided toward the outside in the radial direction of the disc portion 76 through the ribs 91 by the centrifugal force of the rotating disc portion 76, and pushed out to the outside in the radial direction of the disc portion 76. As a result, the intrusion of foreign material between the disc portion 76 and the inner surface portion 70a of the sprocket cover 70 can be effectively prevented. At this time, because the receiving antenna 90 is disposed more inward in the radial direction of the disc portion 76 than the ribs 91, the intrusion of foreign material into a portion of the receiving antenna 90 can be effectively suppressed. Furthermore, since this structure is not a sealing structure, the occurrence of friction can be prevented.

Moreover, the ribs 91 are formed so as to be inclined so that the more outward in the radial direction of the disc portion 76, the more rearward the ribs 91 are positioned with respect to the rotational direction of the disc portion 76. Thus, the force in the rotational direction of the disc portion 76 can be converted into the force in the radial direction of the disc portion 76, thereby allowing more effective discharge of foreign material to the outside.

Furthermore, the cover-side ribs 92 are formed on the inner surface portion 70a of the sprocket cover 70, thereby allowing further effective discharge of foreign material to the outside in association with the ribs 91 on the disc portion 76.

Further, the cover-side ribs 92 are formed so as to be inclined so that the more outward in the radial direction of the disc portion 76, the more forward the cover-side ribs 92 are positioned with respect to the rotational direction of the disc portion 76. Thus, the ribs 91 and the cover-side ribs 92 are arranged so as to intersect with each other, thereby allowing further effective discharge of foreign material to the outside by the centrifugal force of the rotating disc portion 76 and the outward movement of the intersecting portion 100.

Additionally, because the gap between the top of the ribs and the top of the cover-side ribs 92, the gap between the transmitting antenna 88 and the receiving antenna 90, the gap between the inner surface portion 70a of the sprocket cover 70 and the end surface of the disc member 73 are formed in increasing order, even if foreign material intrudes into the inside in the radial direction of the disc portion 76, its size is smaller than the gap between the transmitting antenna 88 and the receiving antenna 90. Therefore, there is no possibility of the occurrence of a malfunction, such as jamming of foreign material, between the inner peripheral surface of the disc member 73 and the outer peripheral surface of the cylindrical portion 89 of the sprocket cover 70. Further, because the gap between the inner surface portion 70a of the sprocket cover 70 and the end surface of the disc member 73 is formed larger than the gap between the transmitting antenna 88 and the receiving antenna 90, the foreign material having intruded between the inner peripheral surface of the disc member 73 and the outer peripheral surface of the cylindrical portion 89 of the sprocket cover 70 can be easily discharged to the outside in the radial direction of the disc member 73.

It should be understood that the above-described embodiments are given to illustrate one aspect to which the present invention is applied, and the present invention is not limited to the above-described embodiments.

For example, although in the above-described embodiment, the description has been given using an example in which the engine 50 is used as a power unit, the present invention can be also applied to, for example, the case where a motor is used as a power unit.

Furthermore, although in the above-described embodiment, the description has been given using an example in which the torque of the output shaft 71 is detected, the present invention can be also applied to, for example, the case where the speed of the output shaft 71 is detected.

REFERENCE SIGNS LIST

50 . . . Engine
52 . . . Crankcase
63 . . . Drive sprocket
70 . . . Sprocket cover
71 . . . Output shaft
72 . . . Bearing
73 . . . Disc member
74 . . . Engaging portion
75 . . . Cylindrical portion
76 . . . Disc portion
81 . . . Housing recessed portion
85 . . . Distortion sensor
86 . . . Controller
88 . . . Transmitting antenna
89 . . . Cylindrical portion
90 . . . Receiving antenna
91 . . . Rib
92 . . . Cover-side rib

The invention claimed is:

1. A sensor arrangement structure, comprising:
a power unit;
an output shaft that protrudes outwardly from a unit case of the power unit;
an output shaft cover that covers the output shaft from outside in a protruding direction of the output shaft; and
a detector that is mounted to the output shaft cover in order to detect rotational speed or torque of the output shaft,
wherein the output shaft is provided with a disc portion at a leading end portion thereof,
the output shaft cover has an inner surface portion disposed along and close to the disc portion,
the disc portion is provided with ribs, the ribs extending in a radial direction of the disc portion toward the inner surface portion, and
wherein, in a cross sectional view of the output shaft cover and the output shaft, and along a longitudinal direction of the output shaft, the detector is disposed more inward in a radial direction of the disc portion than the ribs.

2. The sensor arrangement structure according to claim 1, wherein the ribs are formed so as to be inclined so that the more outward in the radial direction of the disc portion, the more rearward the ribs are positioned with respect to a rotational direction of the disc portion.

3. The sensor arrangement structure according to claim 1, wherein the inner surface portion of the output shaft cover is provided with cover-side ribs, the cover-side ribs extending in the radial direction of the disc portion while protruding toward the disc portion.

4. The sensor arrangement structure according to claim 3, wherein the cover-side ribs are formed so as to be inclined so that the more outward in the radial direction of the disc portion, the more forward the cover-side ribs are positioned with respect to the rotational direction of the disc portion.

5. The sensor arrangement structure according to claim 3, wherein the disc portion is provided with a transmitter that transmits the rotational speed or torque detection signal of the output shaft to the detector; and
wherein a gap between the ribs and the cover-side ribs, a gap between the transmitter and the detector, and a gap between the inner surface portion of the output shaft cover and an end surface of the disc portion are formed in increasing order.

6. A sensor arrangement structure, comprising:
power means for providing motive power;
output means protruding outwardly from the power means;
output cover means for covering the output means in a protruding direction of the output means; and
detector means for detecting rotational speed or torque of the output means, wherein the output means includes disc means at a leading portion thereof, wherein the output cover means includes an inner surface portion disposed along and close to the disc means, wherein the disc means includes rib means extending in a radial direction of the disc means toward the inner surface portion, and wherein, in a cross sectional view of the output cover means and the output means, and along a longitudinal direction of the output means, the detector means is disposed more inward in a radial direction of the disc means than the rib means.

7. The sensor arrangement structure according to claim 6, wherein the rib means are inclined such that the more outward in the radial direction of the disc means, the more rearward the rib means are positioned with respect to a rotational direction of the disc means.

8. The sensor arrangement structure according to claim 6, wherein the inner surface portion is provided with cover-side rib means extending in the radial direction of the disc means while protruding toward the disc means.

9. The sensor arrangement structure according to claim 8, wherein the cover side rib means are inclined so that the more outward in the radial direction of the disc means, the more forward the cover-side rib means are positioned with respect to the rotational direction of the disc means.

10. The sensor arrangement structure according to claim 8, wherein the disc means includes transmitter means for transmitting a rotational speed or torque detection signal of the output means to the detector means, and wherein a gap between the rib means and the cover-side rib means, a gap between the transmitter means and the detector means, and a gap between the inner surface portion and an end surface of the disc means are formed in increasing order.

* * * * *